(12) United States Patent
Lynch

(10) Patent No.: US 10,168,071 B2
(45) Date of Patent: Jan. 1, 2019

(54) LIGHTWEIGHT EQUIPMENT PAD

(71) Applicant: Phil Lynch, Chattanooga, TN (US)

(72) Inventor: Phil Lynch, Chattanooga, TN (US)

( * ) Notice: Subject to any disclaimer, the term of this patent is extended or adjusted under 35 U.S.C. 154(b) by 0 days.

(21) Appl. No.: 15/488,829

(22) Filed: Apr. 17, 2017

(65) Prior Publication Data

US 2017/0299220 A1 Oct. 19, 2017

Related U.S. Application Data

(60) Provisional application No. 62/323,042, filed on Apr. 15, 2016.

(51) Int. Cl.
*F24F 13/32* (2006.01)
*F16M 5/00* (2006.01)

(52) U.S. Cl.
CPC .............. *F24F 13/32* (2013.01); *F16M 5/00* (2013.01); *F16M 2200/08* (2013.01)

(58) Field of Classification Search
CPC ........ F24F 13/32; F16M 5/00; F16M 2200/08
See application file for complete search history.

(56) References Cited

U.S. PATENT DOCUMENTS

| | | | | |
|---|---|---|---|---|
| 2,975,089 A | * | 3/1961 | Hacking | A47G 27/0212 428/168 |
| 4,186,536 A | * | 2/1980 | Piazza | E04C 2/284 264/279 |
| 4,205,136 A | * | 5/1980 | Ohashi | C08G 18/3206 521/118 |
| 5,209,968 A | | 5/1993 | Sweeney | |
| 5,234,990 A | * | 8/1993 | Flaim | C08G 18/3872 430/271.1 |
| 5,728,458 A | | 3/1998 | Sweeney | |
| 5,895,025 A | * | 4/1999 | Alesi | F16M 5/00 108/51.11 |
| 5,961,093 A | | 10/1999 | Jones et al. | |
| 6,395,384 B1 | * | 5/2002 | Adam | F16F 1/44 248/346.01 |
| 6,927,183 B1 | * | 8/2005 | Christen | B29C 63/04 428/121 |
| 9,016,653 B1 | * | 4/2015 | Cox, Jr. | B65D 19/0002 248/346.01 |
| 2007/0042828 A1 | * | 2/2007 | Krushke | B32B 5/18 472/92 |
| 2013/0189471 A1 | * | 7/2013 | Ashelin | E04B 1/941 428/76 |

* cited by examiner

*Primary Examiner* — Anita M King

(57) ABSTRACT

A lightweight equipment pad that is design to place equipment such as outside condenser units includes a closed-cell polyurethane foam core and a UV stable polyurea coating. The closed-cell polyurethane foam core generally formed into a rectangular shape and significantly reduces the overall weight of the lightweight equipment pad in comparison to existing equipment pads. A top surface and a plurality of lateral surfaces of the closed-cell polyurethane foam core are fully covered with the UV stable polyurea coating to improve the strength and durability of the lightweight equipment pad. A top coating of the UV stable polyurea coating that is superimposed onto the top surface functions as a non-skid textured surface to prevent any equipment from shifting following installation.

3 Claims, 7 Drawing Sheets

LIGHTWEIGHT EQUIPMENT PAD

The current application claims a priority to the U.S. Provisional Patent application Ser. No. 62/323,042 filed on Apr. 15, 2016. The current application is filed on Apr. 17, 2017 while Apr. 15, 2017 was on a weekend.

FIELD OF THE INVENTION

The present invention relates generally to an equipment pad and a method of manufacturing the equipment pad. More specifically, the present invention is a lightweight and high strength composite equipment pad that is used for structurally supporting equipment during and following installation so that the present invention can protect the equipment from verity of environmental, atmospheric, and chemical element.

BACKGROUND OF THE INVENTION

Equipment pads was generally constructed onsite by pouring concrete mixtures; however, this method was deemed inconvenient by many because of time spent waiting for favorable weather conditions and for the concrete to dry before beginning equipment installation. As a result, concrete pouring process was improved by prefabricating the equipment pads offsite with concrete or cementitious mixtures (including fabric) and plastic materials, and then shipping to the wholesaler for installers to purchase. Since the weight of concrete equipment pad contributes to high shipping costs and is difficult for the installer to carry onto the jobsite, the equipment pads are manufactured from plastic materials to reduce the weight as an alternative option. However, these equipment pads are not ultraviolet (UV) stable to prevent weather discoloration and degradation. Additionally, equipment pads are also constructed of rubber. But, high material cost of rubber causes these equipment pads to be expensive. Efforts continue for production of a lesser weight pad to drive down shipping costs, and to facilitate installer handling on the worksite, and simultaneously, one of greater strength and durability for upholding the equipment.

It is an object of the present to provide a lightweight equipment pad that is high strength, durable, and crack-resistant. The present invention comprises a heat expansible, closed-cell polyurethane foam core covered by a UV stable polyurea exterior coating. The present invention is usually laid upon a prepared, flat ground surface for installing equipment atop. The overall structure of the present invention is delineated with a top-level surface for equipment support, lateral surfaces, and a bottom surface wherein the size and shape of equipment to be placed determines the size and shape of the present invention. The method of manufacturing the present invention entails forming the foam interior through an open-pour mold. Then, the present invention is removed the foam interior from the mold and sprayed with the UV stable polyurea exterior coating only covering the top surface and the lateral surfaces.

PRIOR ART

Equipment pads once entailed construction onsite by pouring concrete mixtures; however, this method was deemed inconvenient by many because of time spent waiting for favorable weather conditions, and for the concrete to dry before beginning equipment installation. The process was improved by prefabricating the pad offsite with concrete or cementitious mixtures (including fabric, per U.S. Pat. No. 5,728,458) and plastic materials (U.S. Pat. No. 5,209,968), and then shipping to the wholesaler for installers to access. However, since the weight of concrete contributes to high shipping costs, and is arduous for the installer to carry on the jobsite, the industry has sought alternatives. Additionally, plastic materials can easily break during installation and are not UV stable to prevent weather discoloration. The industry has also attempted construction of similar pads using rubber (U.S. Pat. No. 5,961,093), which are expensive to manufacture. Efforts continue for production of a lesser weight pad to drive down shipping costs, and to facilitate installer handling on the worksite, and simultaneously, one of greater strength and durability for upholding the equipment.

DETAIL DESCRIPTIONS OF THE INVENTION

All illustrations of the drawings are for the purpose of describing selected versions of the present invention and are not intended to limit the scope of the present invention.

Figure 1:
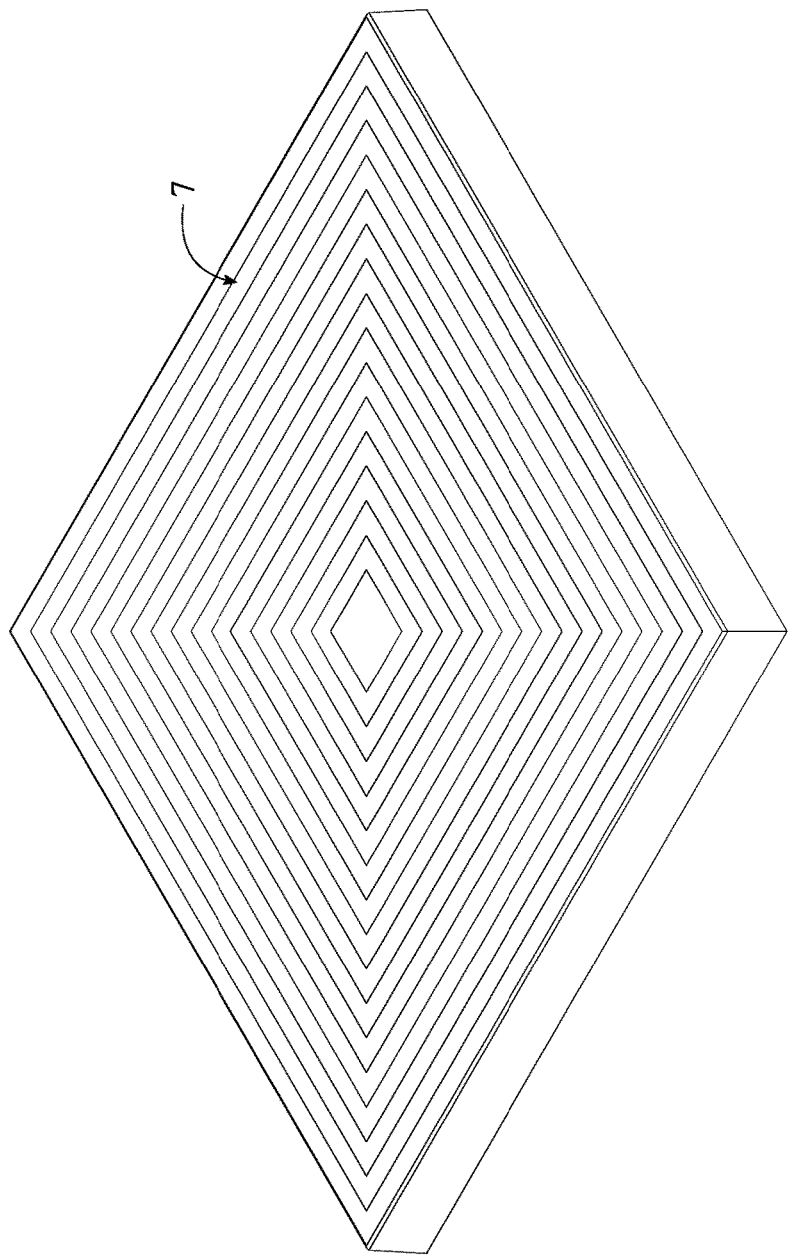
FIG. 1 is a top perspective view of the present invention.

This invention is an equipment pad for structurally supporting and protecting an equipment, such as heating, ventilation, and air conditioning (HVAC) units. The present invention is usually laid upon a prepared, flat ground surface for installing equipment atop the equipment pad. The present invention is preferably formed into a square shape or rectangular shape, depending upon the general size and shape of the equipment to be placed upon. Even though the preferred embodiment of the present invention is formed into a rectangular shape, the present invention is not limited only to the rectangular shape and can be manufactured into any geometric shapes and organic shapes upon consumer request or the equipment specifications. In reference to FIG. 1-2, the present invention comprises at least one closed-cell polyurethane foam core 1 and an ultra violet (UV) stable polyurea coating 7. As a result of the components and their configuration, the present invention provides a lightweight, high strength, durable, and crack-resistant equipment pad. Additionally, since the present invention does not have any hollow spaces, the closed-cell polyurethane foam core 1 and the UV stable polyurea coating 7 yield a monolithic unit.

Figure 3:
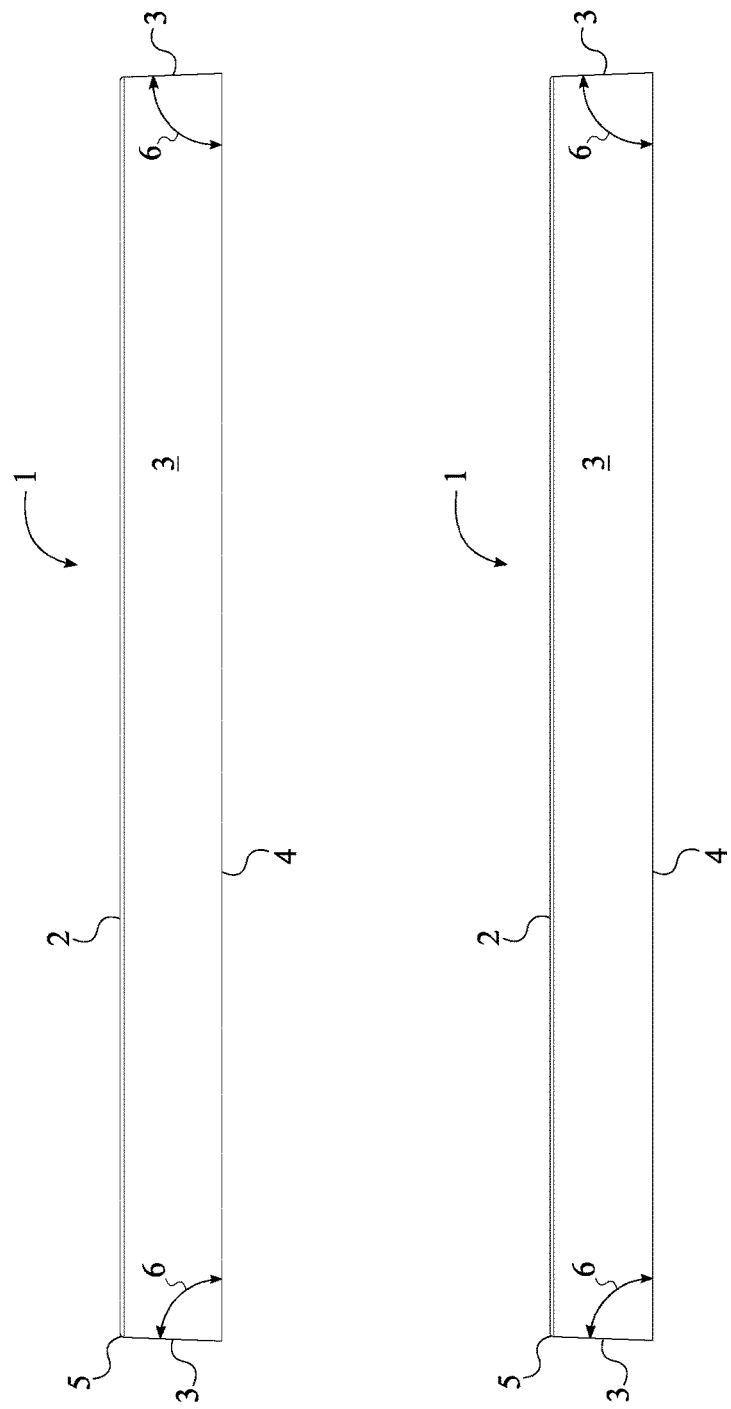
FIG. 3 are front and left side views for the closed-cell polyurethane foam core of the present invention.
Figure 6:
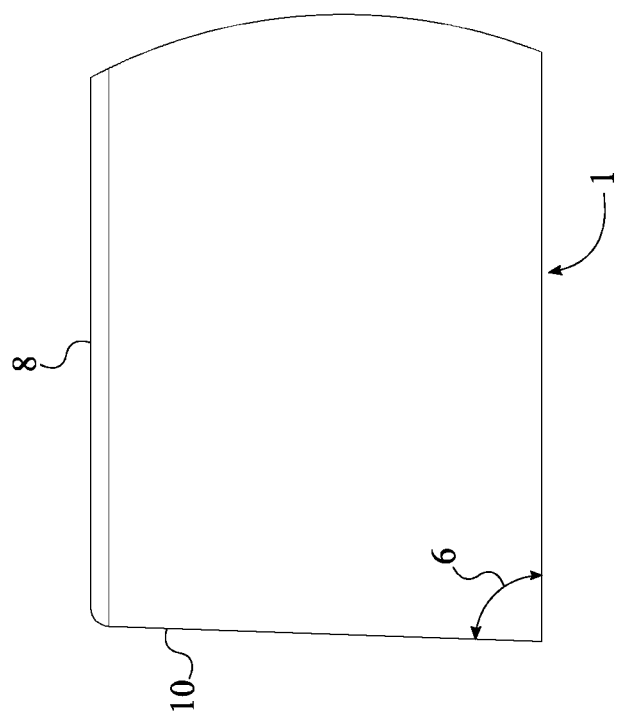
FIG. 6 is a detailed view of the present invention taken along section B of FIG. 4.

In reference to FIG. 3, the closed-cell polyurethane foam core 1 comprises a top surface 2, a plurality of lateral surfaces 3, and a bottom surface 4. More specifically, the top surface 2 is concentrically positioned to the bottom surface 4 as the top surface 2 and the bottom surface 4 are oppositely positioned of each other along the plurality of lateral surfaces 3. The plurality of lateral surfaces 3 delineates the general shape of the present invention. For example, the preferred embodiment comprises a front lateral surface, a left lateral surface, a right lateral surface, and a rear lateral surface since the preferred embodiment is formed into a rectangular shape. In reference to FIG. 3 and FIG. 6, the bottom surface 4 and each of the plurality of lateral surfaces 3 is oriented at an acute angle 6 so as to form the closed-cell polyurethane foam core 1 into a trapezoidal shape, wherein the acute angle 6 is about 88 degrees. In other words, the plurality of lateral surfaces 3 manufactured as a 2 degree beveled sides in order to improve the aesthetic appearance and to reinforced strength of the present invention. The closed-cell polyurethane foam core 1 is preferably formed using a pour gun and open-pour mold with the polyurethane foam material, specifically chosen because of its superiority in core strength in comparison to polystyrene foam. The closed-cell polyurethane foam core 1 weighs around 2 pounds per cubic foot, providing lightweight apparatus for easy handling and a stable and level mount to position the equipment.

In reference to FIG. 3, a fillet top edge 5 is perimetrically positioned in between the top surface 2 and the plurality of lateral surfaces 3 to further reinforced strength of the present invention and prevent accidental chipping of the present invention. The fillet top edge 5 is preferably curved into a ⅛-inch radius so that the fillet top edge 5 can seamlessly join the top surface 2 and the plurality of lateral surfaces 3 while eliminating shape edges.

Figure 2:
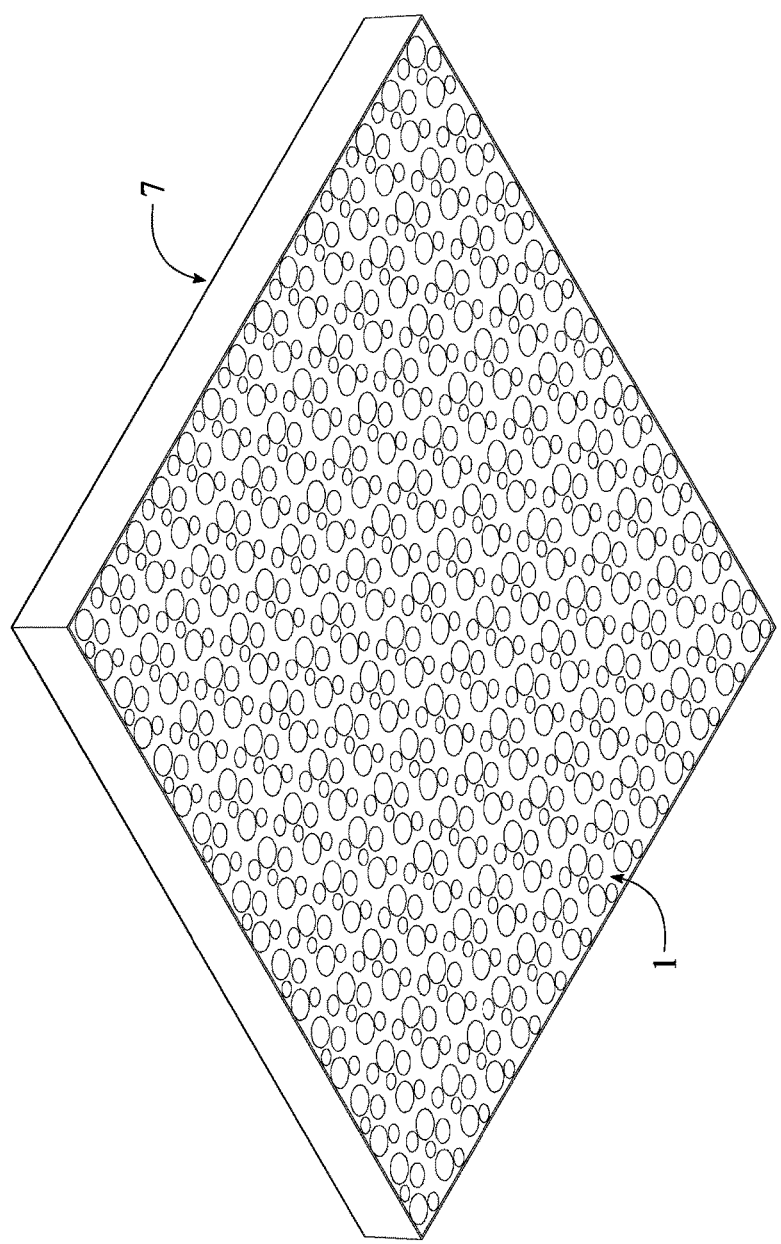
FIG. 2 is a bottom perspective view of the present invention.
Figure 4:
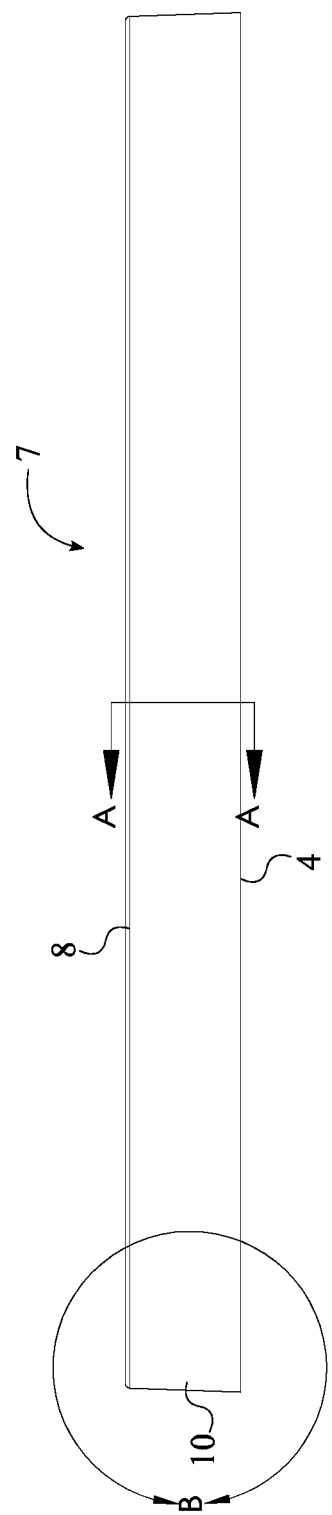
FIG. 4 is a side view of the present invention, showing the plane upon which a cross sectional view is taken shown in FIG. 5 and a detailed view is taken shown in FIG. 6.
Figure 5:
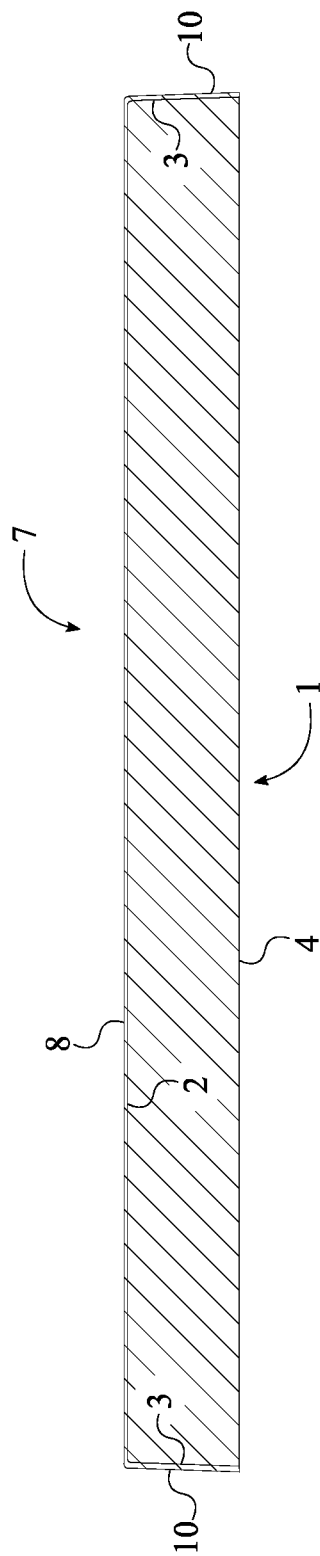
FIG. 5 is a cross section view of the present invention taken along line A-A of FIG. 4.
Figure 7:
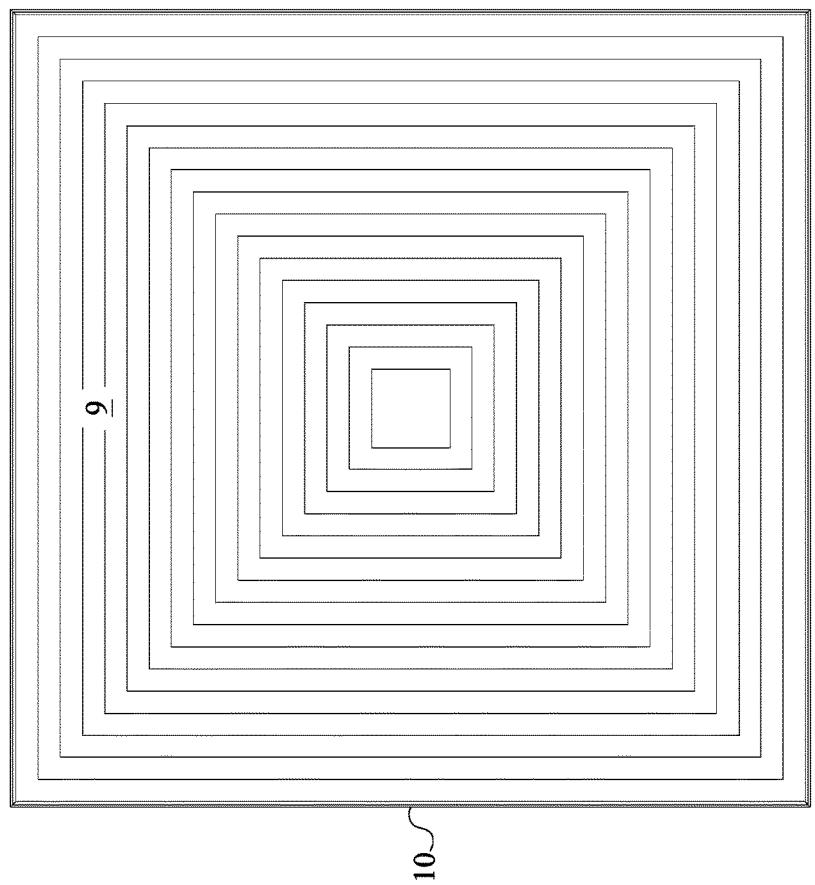
FIG. 7 is a top view of the present invention, showing the non-skid textured surface.

In reference to FIG. 2, FIG. 4, and FIG. 5, the closed-cell polyurethane foam core 1 is partially covered with the UV stable polyurea coating 7. More specifically, a top coating 8 of the UV stable polyurea coating 7 is superimposed onto the top surface 2 while a lateral coating 10 of the UV stable polyurea coating 7 is superimposed onto the plurality of lateral surfaces 3. The UV stable polyurea coating 7 is selected as the preferred coating within the present invention due to its ability to resist discoloration and degradation from sun exposure, impact and abrasion from common landscaping activities, pest infestation, atmospheric elements such as temperature extremes and moisture, and chemicals such as compressor oil. In reference to FIG. 7, the top coating 8 functions as a non-skid textured surface 9 that is designed to prevent the equipment from shifting following installation.

Testing for the UV stable polyurea coating 7, in accordance with ASTM E-84, demonstrates that the present invention has a flame spread index of 20 as the flame spread index is a ranking derived by laboratory standard test methodology of a material's propensity to burn rapidly and spread flames, and its spectrum of measurement is 0-200. In accordance with ASTM E-84 the present invention also demonstrates a smoke developed index of 250 as the smoke developed index measures concentration of smoke a material emits as it burns, and its spectrum of measurement is 0-450.

In reference to a preferred method of manufacturing, the present invention is manufactured to an orthographic projection view of a typical 36 inch×36 inch×3 inch, as these specifications are increasingly required by local codes for HVAC units. More specifically, the closed-cell polyurethane foam core 1 is formed using a pour gun and open-pour mold with the polyurethane foam material for approximately 10-20 seconds. Then, the expansible polyurethane foam material is deposited within the mold, filling the internal volume defined by the mold's margins. Expansion rate of the polyurethane foam material is based on 1:1 ratio parts by volume of polyol and isocyanate, and temperatures of approximately 140° F. at 2400-3000 pounds per square inch (psi). After expanding and curing for approximately 4-5 minutes, the partially cured, semi-rigid closed-cell polyurethane foam core 1 is removed from the mold, aided by a mold-release agent, and moved to the exterior coating station. At the coating station, the polyurea and isocyanate chemicals are heated at approximately 140° F., combined at 1:1 parts, and deposited through a machine hose as the UV stable polyurea coating 7. The UV stable polyurea coating 7 is generally spray-applied in smooth, multi-directional passes to achieve desired thickness, and cures within approximately two seconds. Since the present invention comprises only different materials, the manufacturing process proves to be simple and efficient, compared to methods involving multi-layers of fabric, concrete, and cementitious mixtures. The closed-cell polyurethane foam core 1 may be dyed with a neutral gray color or any other similar color as the UV stable polyurea coating 7 so the bottom surface 4 that remains uncoated on the closed-cell polyurethane foam core 1 visually blends with the UV stable polyurea coating 7.

One objective of the present invention is to offer a portable, non-concrete equipment pad that is considerably lesser weight than other composite pads currently offered in the market so that the retailers can easily stack the present invention in a sales floor and the installers can easily transport and handle the present invention on the jobsite. A second objective of the present invention is to provide an equipment pad of equal or greater strength, stability, and durability to hold up substantially heavy equipment and to facilitate ease of installation. A third objective of the present invention is to provide a consistently true 3-inch or more in thickness for an equipment pad to comply with local codes for HVAC units. A fourth objective of the present invention is to supply a mounting base that comprises the non-skid textured surface 9 that prevents the equipment to be placed upon from shifting after installation. A fifth objective of the present invention is to offer an equipment pad comprises of materials designed to protect equipment to be placed upon from moisture, insects, temperature extremes, and chemicals (e.g., compressor oil); absorb noise, and vibration generated by the equipment. As a result, the present invention prevents cracking and breaking during and following installation through material strength and flexibility, guards against abrasion or chipping from common landscaping activities, prevents the unit from slipping or shifting, and resists discoloration and degradation from sun exposure. A final objective of the present invention is to provide an equipment pad pigmented into a dark, neutral color so that it remains inconspicuous in surrounding landscape. Additional objects, features, and advantages of the present invention becomes apparent upon the preferred embodiment of the invention in conjunction with the drawings as the equipment pad may also be more broadly used for other approved applications, varying mold shapes, as well as other pigment colors.

Although the invention has been explained in relation to its preferred embodiment, it is to be understood that many other possible modifications and variations can be made without departing from the spirit and scope of the invention as hereinafter claimed.

What is claimed is:
1. A lightweight equipment pad comprising:
    a closed-cell polyurethane foam core;
    an ultra violet (UV) stable polyurea coating;
    the closed-cell polyurethane foam core comprising a top surface, a plurality of lateral surfaces, a bottom surface and a fillet top edge;
    the UV stable polyurea coating comprising a top coating and a lateral coating;
    the top coating being superimposed onto the top surface;

the lateral coating being superimposed onto the plurality of lateral surfaces;

the UV stable polyurea coating being not superimposed onto the bottom surface;

the top surface being concentrically positioned to the bottom surface;

the top surface and the bottom surface being oppositely positioned of each other along the plurality of lateral surfaces;

the bottom surface and each of the plurality of lateral surfaces being oriented at an acute angle so as to form the closed-cell polyurethane foam core into a trapezoidal shape;

the acute angle being about 88 degrees;

the fillet top edge being perimetrically positioned in between the top surface and the plurality of lateral surfaces;

the closed-cell polyurethane foam core being dyed with a color similar to a color of the UV stable polyurea coating so as to render the bottom surface being visually blended with the top coating and the lateral coating;

the top coating being a non-skid textured surface;

the non-skid textured surface comprising a pattern;

the pattern being consisting of a plurality of rectangles; and the plurality of rectangles being in a concentric arrangement.

2. The lightweight equipment pad as claimed in claim 1, wherein a flame spread index of the UV stable polyurea coating is about 20.

3. The lightweight equipment pad as claimed in claim 1, wherein a smoke developed index of the UV stable polyurea coating is about 250.

\* \* \* \* \*